United States Patent
Tripathi et al.

(10) Patent No.: US 9,237,090 B2
(45) Date of Patent: Jan. 12, 2016

(54) NETWORK ROUTING SYSTEMS AND METHODS FOR VALIDATION OF PATHS SUBSEQUENT TO VALIDATION FAILURE

(71) Applicants: Shalendra Tripathi, Gurgaon (IN); Piyush Sharma, Gurgaon (IN); Waseem Reyaz Khan, Gurgaon (IN); Kapil Chopra, Delhi (IN)

(72) Inventors: Shalendra Tripathi, Gurgaon (IN); Piyush Sharma, Gurgaon (IN); Waseem Reyaz Khan, Gurgaon (IN); Kapil Chopra, Delhi (IN)

(73) Assignee: Ciena Corporation, Hanover, MD (US)

( * ) Notice: Subject to any disclaimer, the term of this patent is extended or adjusted under 35 U.S.C. 154(b) by 98 days.

(21) Appl. No.: 14/316,882

(22) Filed: Jun. 27, 2014

(65) Prior Publication Data

US 2015/0334005 A1    Nov. 19, 2015

(30) Foreign Application Priority Data

May 16, 2014    (IN) .............................. 1308/DEL/2014

(51) Int. Cl.
 *H04L 12/24* (2006.01)
 *H04L 12/707* (2013.01)
 *H04Q 11/00* (2006.01)

(52) U.S. Cl.
 CPC ............ *H04L 45/22* (2013.01); *H04L 41/0686* (2013.01); *H04Q 11/0066* (2013.01); *H04Q 11/0062* (2013.01); *H04Q 2011/0073* (2013.01); *H04Q 2011/0081* (2013.01); *H04Q 2011/0086* (2013.01)

(58) Field of Classification Search
 CPC .. H04J 14/0227; H04J 14/0284; H04L 45/22; H04L 41/0686; H04Q 11/0066; H04Q 11/0062; H04Q 2011/0081; H04Q 2011/0086; H04Q 2011/0073
 See application file for complete search history.

(56) References Cited

U.S. PATENT DOCUMENTS

| 7,233,743 | B2 | 6/2007 | Ozugur et al. |
| 7,391,720 | B1 | 6/2008 | Kuditipudi et al. |
| 7,529,257 | B1 | 5/2009 | Tappan |
| 7,583,593 | B2 * | 9/2009 | Guichard ............ H04L 12/2697 370/225 |
| 7,852,863 | B2 | 12/2010 | Madrahalli et al. |
| 8,050,277 | B2 | 11/2011 | Sun |

(Continued)

OTHER PUBLICATIONS

Esmaeili et al., "Enhanced Crankback for Lightpath Setup in Multi-Domain Optical Networks", IEEE Communications Letters, May 2010.*

(Continued)

*Primary Examiner* — Brian O'Connor
(74) *Attorney, Agent, or Firm* — Clements Bernard PLLC; Christopher L. Bernard; Lawrence A. Baratta, Jr.

(57) ABSTRACT

A method, a network, and a node include computing a path by a source node; sending a message to nodes in the path with associated validation criteria; locally checking the validation criteria at each of the nodes in the path; if the validation criteria is satisfied at the node, forwarding the message to the next node in the path; else there is a validation criteria failure at the node, appending feedback data to the message, converting the message to a validation message, and forwarding the validation message to the next node in the path; and at a destination node, if there are no validation criteria failures, then establishing the connection; else issuing a release message to the source node with all the feedback such that the source node can compute a new path exclusive of nodes where the validation criteria fails.

20 Claims, 10 Drawing Sheets

(56) References Cited

U.S. PATENT DOCUMENTS

| | | | |
|---|---|---|---|
| 8,165,031 B2* | 4/2012 | Mohan | H04L 12/4641 370/217 |
| 8,441,937 B2 | 5/2013 | Gero et al. | |
| 8,509,055 B2* | 8/2013 | Khan | H04J 3/14 370/216 |
| 8,619,553 B2 | 12/2013 | Madrahalli et al. | |
| 8,666,247 B2 | 3/2014 | Srinivasan et al. | |
| 8,670,666 B2 | 3/2014 | Pastorelli et al. | |
| 8,682,160 B2* | 3/2014 | Prakash | H04J 14/0257 398/48 |
| 8,855,483 B2* | 10/2014 | Castoldi | H04J 14/0227 398/19 |
| 2008/0130677 A1 | 6/2008 | Attarwala et al. | |
| 2010/0272435 A1* | 10/2010 | Pastorelli | H04B 10/0793 398/25 |
| 2011/0142450 A1* | 6/2011 | Tanzi | H04J 14/0257 398/79 |
| 2012/0321297 A1* | 12/2012 | Bottari | H04J 14/02 398/26 |
| 2013/0202299 A1* | 8/2013 | Prakash | H04J 14/0257 398/51 |
| 2014/0169783 A1 | 6/2014 | Surek | |
| 2014/0211612 A1* | 7/2014 | Dutti | H04L 45/22 370/225 |
| 2014/0334813 A1* | 11/2014 | Pastorelli | H04B 10/0793 398/25 |

OTHER PUBLICATIONS

"Generalized Multi-Protocol Label Switching (GMPLS) Architecture," Network Working Group, Request for Comments: 3945, Category: Standards Track, Oct. 2004, pp. 1-69.

"Architecture for the automatically switched optical network," International Telecommunication Union, Feb. 2012, pp. 1-124.

* cited by examiner

NETWORK ROUTING SYSTEMS AND METHODS FOR VALIDATION OF PATHS SUBSEQUENT TO VALIDATION FAILURE

FIELD OF THE DISCLOSURE

The present disclosure relates generally to networking systems and methods. More particularly, the present disclosure relates to network routing systems and methods for validation of paths subsequent to validation failure.

BACKGROUND OF THE DISCLOSURE

Optical network control planes provide automatic allocation of network resources in an end-to-end manner. Exemplary control planes may include Automatically Switched Optical Network (ASON) as defined in G.8080/Y.1304, Architecture for the automatically switched optical network (ASON), the contents of which are herein incorporated by reference; Generalized Multi-Protocol Label Switching (GMPLS) Architecture as defined in Request for Comments (RFC): 3945 and the like, the contents of which are herein incorporated by reference; Optical Signaling and Routing Protocol (OSRP) from Ciena Corporation which is an optical signaling and routing protocol similar to PNNI (Private Network-to-Network Interface) and MPLS; or any other type control plane for controlling network elements at one or more layers, and establishing connections there between. As described herein, these control planes may be referred to as control planes as they deal with routing signals at Layers 0, 1, and 2, i.e., photonic signals, time division multiplexing (TDM) signals such as, for example, Synchronous Optical Network (SONET), Synchronous Digital Hierarchy (SDH), Optical Transport Network (OTN), Ethernet, MPLS, and the like. Control planes are configured to establish end-to-end signaled connections such as sub-network connections (SNCs) in ASON or OSRP and label switched paths (LSPs) in GMPLS and MPLS. Control planes use the available paths to route the services and program the underlying hardware accordingly.

In operation, an optical network operating a control plane includes interconnected network elements that exchange information with one another via control plane signaling. As such, each network element has a routing database with up-to-date information about the network, e.g., topology, bandwidth utilization, etc., that enables path computation at a connection's source node (i.e., an originating node). Once a path is computed for the connection, the source node sends a setup message with validation criteria to each node in the computed path, i.e., any intermediate nodes along to a destination node (i.e., a terminating node). Note, the computed path is determined based on the information in the routing database of the source node, but the connection may have other criteria that needs to be validated at each other node in the computed path, and this validation criteria information is not necessarily available to the source node. The source node defines what criteria the intermediate nodes need to validate and examples of validation criteria can include available bandwidth on aggregated links, available bandwidth to resize Optical channel Data Unit-flex (ODUflex) connections, route diversity, etc. That is, the validation criteria can be anything that the source node is not able to detect locally during the path computation based on information stored in the source node's routing database. For example, information which is prone to change frequently over time may not be flooded in the control plane.

Conventionally, if there is more than one node in the path which does not meet the validation criteria of a connection, the first node when the validation criteria is not met issues a release or crankback from the setup and the source node gets feedback only from the first point of failure. Since there is at least one more node in this path that fails the validation criteria, there is an increased probability that the next setup or other action might fail on a second node which also does not satisfy the validation criteria. For example, after two consecutive failures, an SNC goes into back off which can cause a traffic hit of at least 1 sec. Avoiding the second release or crankback would be a great advantage over the conventional approach.

BRIEF SUMMARY OF THE DISCLOSURE

In various exemplary embodiments, network routing systems and methods for validation of paths subsequent to validation failure cause a setup or other action to continue on even in a failure scenario to collect feedback of a complete path for a connection. The release or crankback is generates at the destination node as opposed to the node where the failure occurs, and the release or crankback includes the feedback. Based on the feedback received, the originating node can decide the new path. In this manner, the message starts behaving like a validation message from the node where the first failure happens. This validation message gathers information about the validation criteria on the remaining nodes in the path such that the originating node can make a better informed choice for a new path or hold off appropriately. Advantageously, the network routing systems and methods do not introduce new signaling to the control plane, but rather add behavior and information to existing messages.

In an exemplary embodiment, a method includes computing a path by a source node; sending a message to nodes in the path with associated validation criteria; locally checking the validation criteria at each of the nodes in the path; if the validation criteria is satisfied at the node, forwarding the message to the next node in the path; else there is a validation criteria failure at the node, appending feedback data to the message, converting the message to a validation message, and forwarding the validation message to the next node in the path; and at a destination node, if there are no validation criteria failures, then establishing the connection; else issuing a release message to the source node with all the feedback such that the source node can compute a new path exclusive of nodes where the validation criteria fails. The method can further include computing the path by the source node based on information flooded to the source node in a control plane; and determining the associated validation criteria based on lacking the information at the source node such that the associated validation criteria has to be locally checked at each of the nodes in the path. The method can further include providing the feedback at each of the nodes in the path where there is a validation criteria failure based on the associated validation criteria.

The feedback can include which nodes to avoid in the new path, a minimum size for resizing the connection, and/or a hold off time. The network can include an optical network and the control plane can include any of Automatically Switched Optical Network (ASON), Generalized Multi-Protocol Label Switching (GMPLS), and Optical Signaling and Routing Protocol (OSRP). The validation message can include a standard setup message in the control plane with additional information related to setup state (setup is OK or FAILED), validation criteria, and feedback. The release message can include a standard crankback message in the control plane with additional information related to the feedback.

In another exemplary embodiment, a network includes a source node for a connection configured to compute a path for the connection and to send a message to nodes in the path with associated validation criteria for each of the nodes in the path; each of the nodes in the path configured to, if the validation criteria is satisfied at the node, forward the message to the next node in the path; else there is a validation criteria failure at the node, append feedback data to the message, convert the message to a validation message, and forward the validation message to the next node in the path; and a destination node for the connection configured to, if there are no validation criteria failures, then establish the connection; else issue a release message to the source node with all the feedback such that the source node can compute a new path exclusive of nodes where the validation criteria fails. The source node can be configured to: compute the path based on information flooded to the source node in a control plane; and determine the associated validation criteria based on lacking the information at the source node such that the associated validation criteria has to be locally checked at each of the nodes in the path. The each of the nodes in the path and the destination node can be configured to: provide the feedback where there is a validation criteria failure based on the associated validation criteria.

The feedback can include which nodes to avoid in the new path, a minimum size for resizing the connection, and/or a hold off time. The network can include an optical network and the control plane can include any of Automatically Switched Optical Network (ASON), Generalized Multi-Protocol Label Switching (GMPLS), and Optical Signaling and Routing Protocol (OSRP). The validation message can include a standard setup message in the control plane with additional information related to setup state (setup is OK or FAILED), validation criteria, and feedback. The release message can include a standard crankback message in the control plane with additional information related to the feedback.

In yet another exemplary embodiment, a node includes one or more ports forming a part of a connection in a network; and a controller communicatively coupled to the one or more ports and operating a control plane with other nodes in the network, the controller is configured to: if the node is a source node for the connection, compute a path for the connection and send a message to nodes in the path with associated validation criteria for each of the nodes in the path; if the node is an intermediate node in the path, if the validation criteria is satisfied at the node, forward the message to the next node in the path; else there is a validation criteria failure at the node, append feedback data to the message, convert the message to a validation message, and forward the validation message to the next node in the path; and if the node is a destination node for the connection, if there are no validation criteria failures, then establish the connection; else issue a release message to the source node with all the feedback such that the source node can compute a new path exclusive of nodes where the validation criteria fails.

If the node is the source node, the node can be configured to: compute the path based on information flooded to the source node in a control plane; and determine the associated validation criteria based on lacking the information at the source node such that the associated validation criteria has to be locally checked at each of the nodes in the path; and wherein if the node is the intermediate node or the destination node, the node can be configured to: provide the feedback where there is a validation criteria failure based on the associated validation criteria. The feedback can include which nodes to avoid in the new path, a minimum size for resizing the connection, and/or a hold off time. The network can include an optical network and the control plane can include any of Automatically Switched Optical Network (ASON), Generalized Multi-Protocol Label Switching (GMPLS), and Optical Signaling and Routing Protocol (OSRP). The validation message can include a standard setup message in the control plane with additional information related to setup state (setup is OK or FAILED), validation criteria, and feedback. The release message can include a standard crankback message in the control plane with additional information related to the feedback.

BRIEF DESCRIPTION OF THE DRAWINGS

The present disclosure is illustrated and described herein with reference to the various drawings, in which like reference numbers are used to denote like system components/method steps, as appropriate, and in which:

FIG. 11 is a block diagram of a controller to provide control plane processing and/or operations, administration, maintenance, and provisioning (OAM&P) for the node of FIG. 10 or the like.

DETAILED DESCRIPTION OF THE DISCLOSURE

In various exemplary embodiments, the network routing systems and methods for validation of paths subsequent to validation failure prevents the aforementioned second release or crankback (or more). The network routing systems and methods continue the validation along the computed path despite the initial validation criteria failure and continues to the destination node which sends the release or crankback with information for the whole path, i.e., regarding all nodes where the validation criteria fails such that the source node can decide a new path avoiding the nodes where the validation criteria fails. That is, a setup message (or any other type of connection message), subsequent to the first node where the validation criteria fails, acts as a setup-validation message that collects information from subsequent nodes such that the source node can recomputed the path exclusive of any nodes where the validation criteria fails. In turn, the network routing systems and methods avoid subsequent crankbacks based on validation criteria failures at nodes on the originally computed path since the source node can compute the new path exclusive of nodes that violate the validation criteria. For example, if the current path is the only path for that SNC (Designated Transit List (DTL) exclusive), then with the help of received feedback, the originating node shall know when that path is expected to become usable in future (a case applicable to Time of Day Reversion (TODR), for example).

Figure 1:
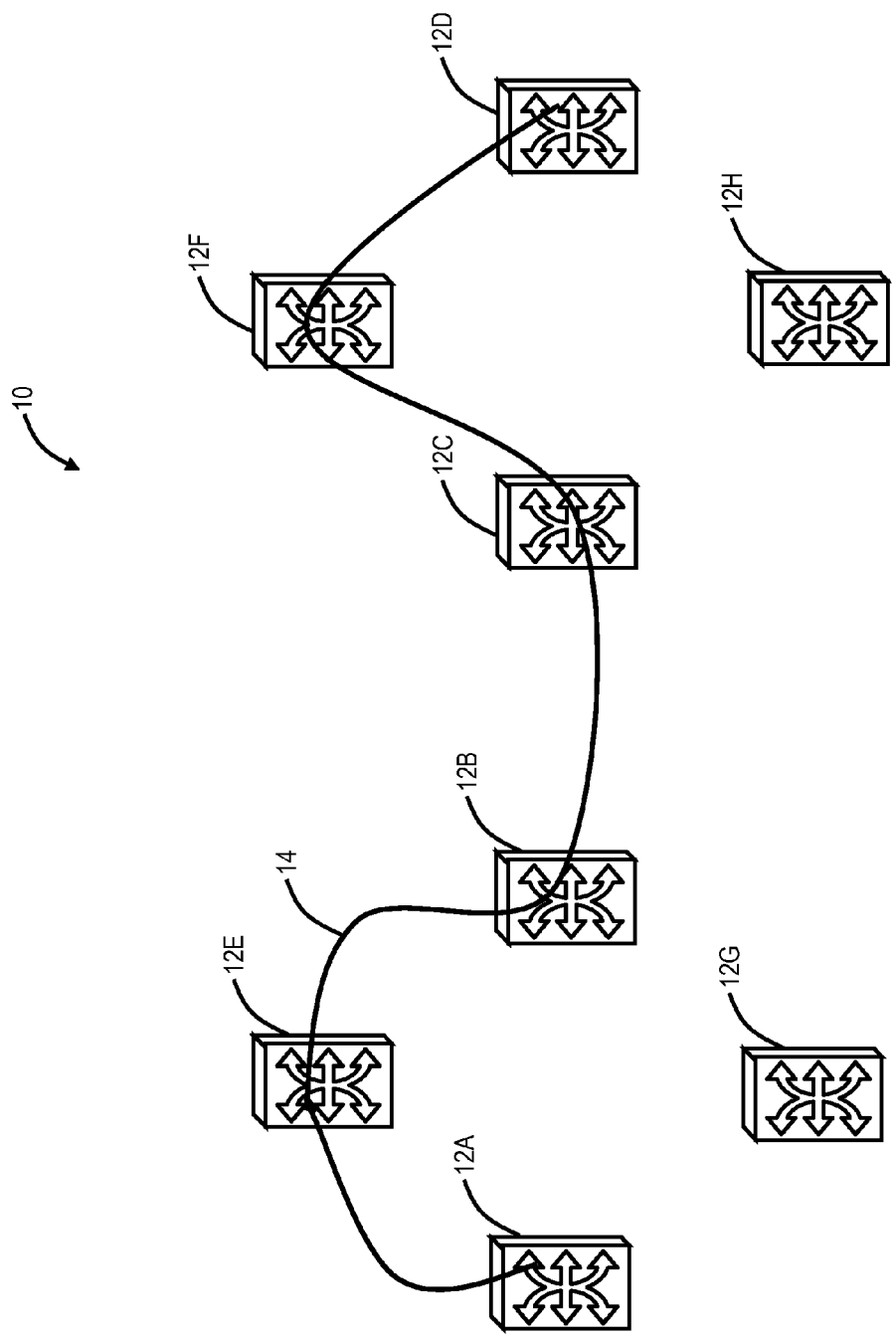
FIG. 1 is a network diagram of a network of a plurality of interconnected nodes operating a control plane.
Figure 10:
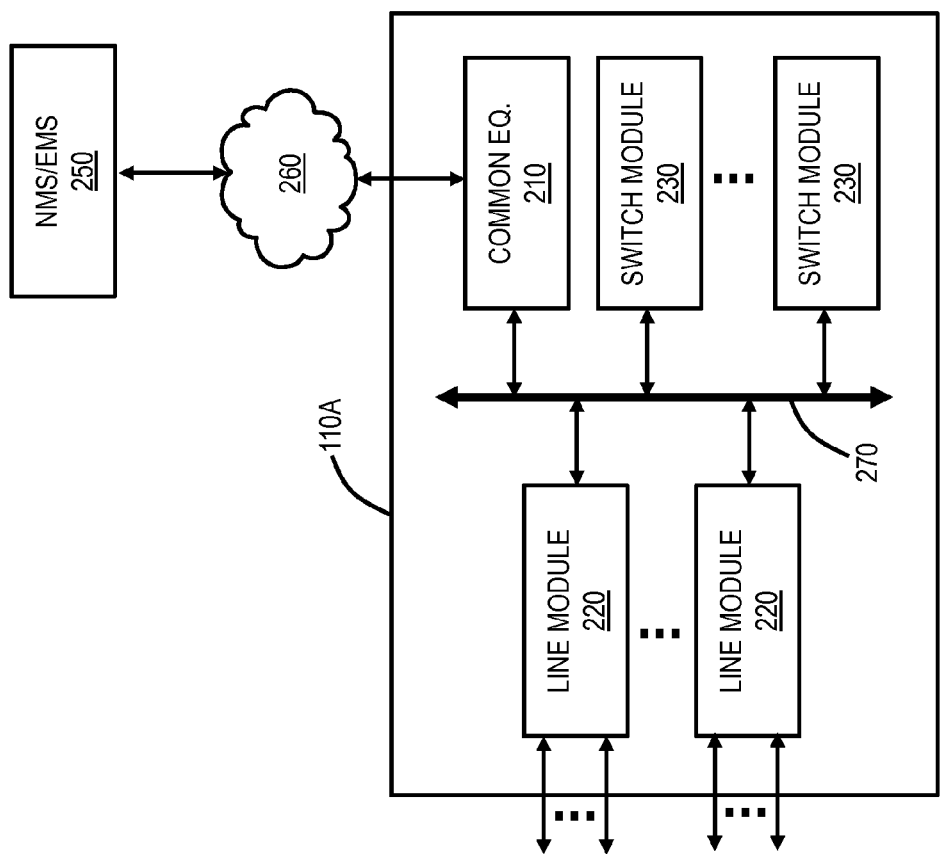
FIG. 10 is a block diagram of an exemplary node for use with the systems and methods described herein.

Referring to FIG. 1, in an exemplary embodiment, a network diagram illustrates a network 10 of a plurality of interconnected nodes 12A, 12B, . . . , 12H operating a control plane. Each of the nodes 12A-12H include one or more links for interconnection which are omitted herein for ease of illustration. The nodes 12A-12H can be network elements such as optical switches, add/drop multiplexers, cross-connects, etc. that operate the control plane (e.g., ASON, GMPLS, OSRP, etc.) and provide signaled connections therebetween (e.g., SNCs, LSPs, etc.). An exemplary implementation of a node 12 is illustrated in FIG. 10. In the context of the control plane, the nodes 12A-12H flood routing information to one another and store such information in an associated routing database. As described herein, the routing database does not necessarily have all the information for the network 10 to find a valid path. Information which is prone to get changed frequently with respect of time is not flooded in the control plane. So, for example, if an SNC 14 (or LSP) is required in the network 10, the source node, e.g., the node 14A, computes a path and sends a setup message with validation criteria that needs to be evaluated locally at each of the nodes in the path (e.g., the nodes 12E, 12B, 12C, 12F, 12D). In the example of FIG. 1, the node 12A computes a path and sends a setup message along the computed path (to the nodes 12E, 12B, 12C, 12F, 12D). Each of the nodes 12E, 12B, 12C, 12F, 12D performs a validation criteria check based on the setup message and sends the setup message along until the SNC 14 is established (e.g., assuming in this example of FIG. 1 that all the nodes 12E, 12B, 12C, 12F, 12D pass the validation criteria). Note, while described herein with reference to SNC connections, those of ordinary skill in the art will recognize the systems and methods contemplate operation with LSPs or other signaled connections by the control plane.

Figure 2:
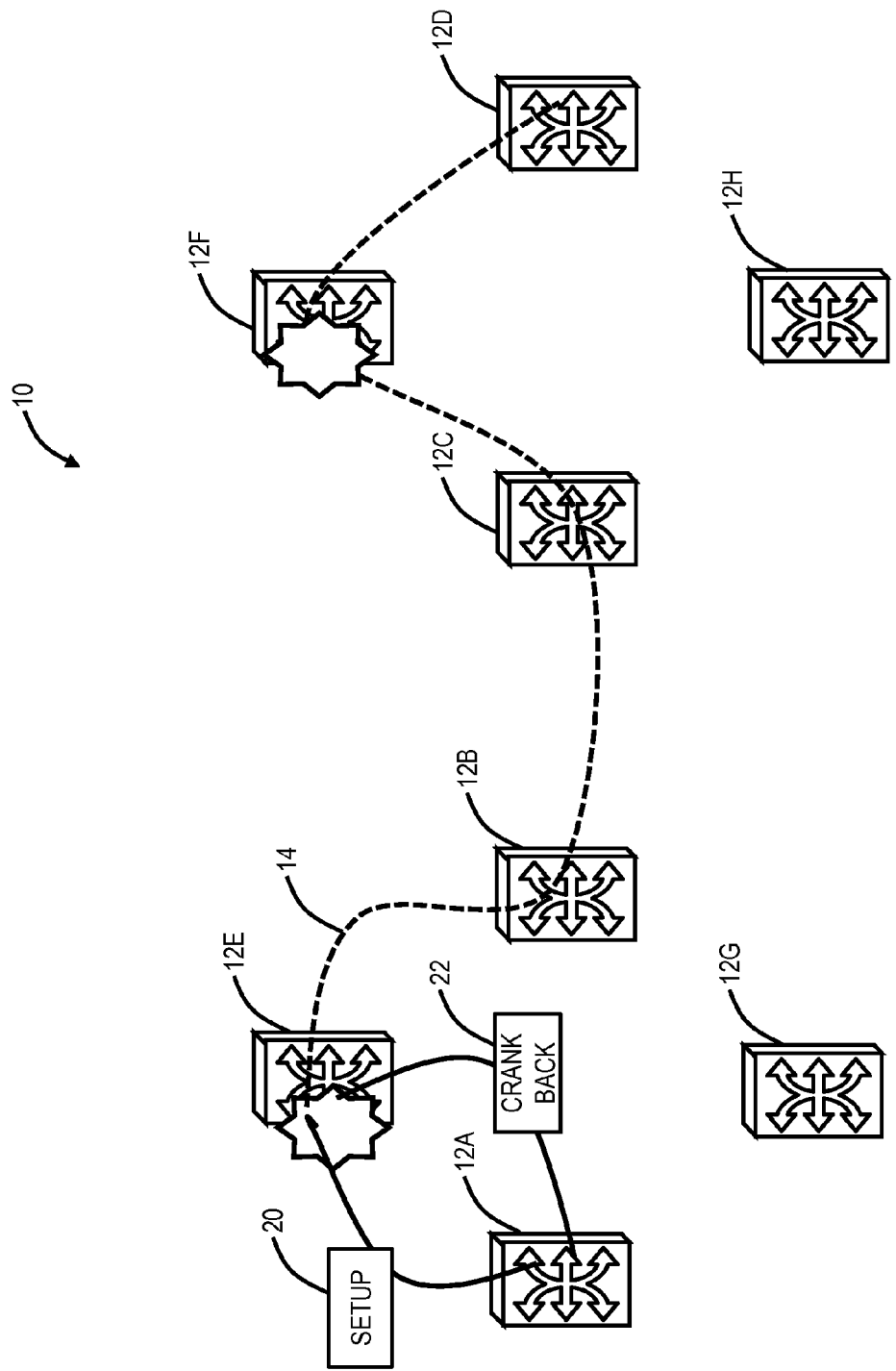
FIG. 2 is a network diagram of the network of FIG. 1 showing conventional behavior for a first attempt to establish a connection when two or more nodes in a computed path fail the validation criteria.
Figure 3:
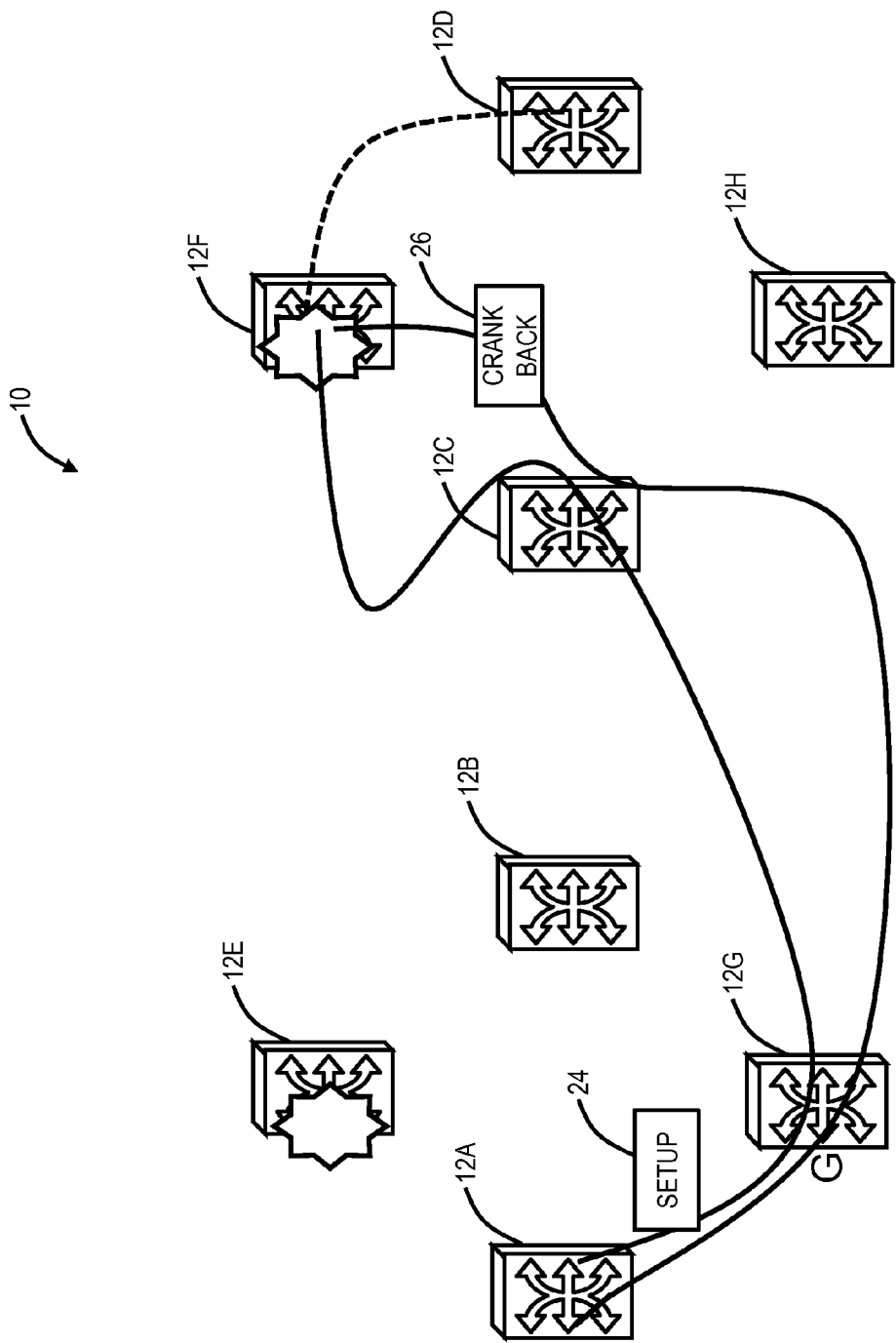
FIG. 3 is a network diagram of the network of FIG. 1 showing conventional behavior for a second attempt from FIG. 2 to establish a connection when two or more nodes in a computed path fail the validation criteria.

Referring to FIGS. 2-3, in conventional embodiments, network diagrams illustrate the network 10 showing conventional behavior when two or more nodes 12E, 12F in a computed path fail the validation criteria. Specifically, FIGS. 2-3 include the same SNC 14 as FIG. 1, but in this example, the nodes 12E, 12F fail the validation criteria set by the source node 12A. In FIG. 2, the source node 12A computes the path for the SNC 14 as before, i.e., through the nodes 12E, 12B, 12C, 12F, 12D. Subsequent to path computation, the source node 12A sends a setup message 20 with the associated validation criteria to the node 12E which performs local validation of the validation criteria consistent with the setup message 20. Since the node 12E fails the validation criteria, the node 12E issues a first crankback message 22 to the node 12A in the conventional behavior. FIG. 2 illustrates a first try to establish the SNC 14, and the first crankback message 22 acts as a release terminating this first try and instructing the source node 12A to recompute a new path for the SNC 14 exclusive of the node 12E.

In FIG. 3, the source node 12A has received the crankback message 22, and it recomputes the new path for the SNC 14 exclusive of the node 12E, such as, e.g., through the nodes 12G, 12C, 12F, 12D. Subsequent to the new path computation, the source node 12A sends a setup message 24 with the associated validation criteria to the nodes 12G, 12C, 12F which each perform local validation of the validation criteria consistent with the setup message 24. Note, the validation criteria passes at the nodes 12G, 12C and the setup message 24 is passed to the node 12F where the validation criteria fails, and the node 12F issued a second crankback message 26 to the node 12A in the conventional behavior. Now, after the second try of FIG. 3, there have been two crankbacks in trying to establish the SNC 14. In some control planes, the SNC formation would perform a back off and try again, such as repeating the same process described in FIG. 2—in which case the SNC 14 may never come up unless the validation criteria failures are addressed at the nodes 12E, 12F. In other control planes, the source node 12A could perform a third path computation. Either way, the SNC formation has been delayed due to the failure of validation criteria at the nodes 12E. 12F.

Figure 4:
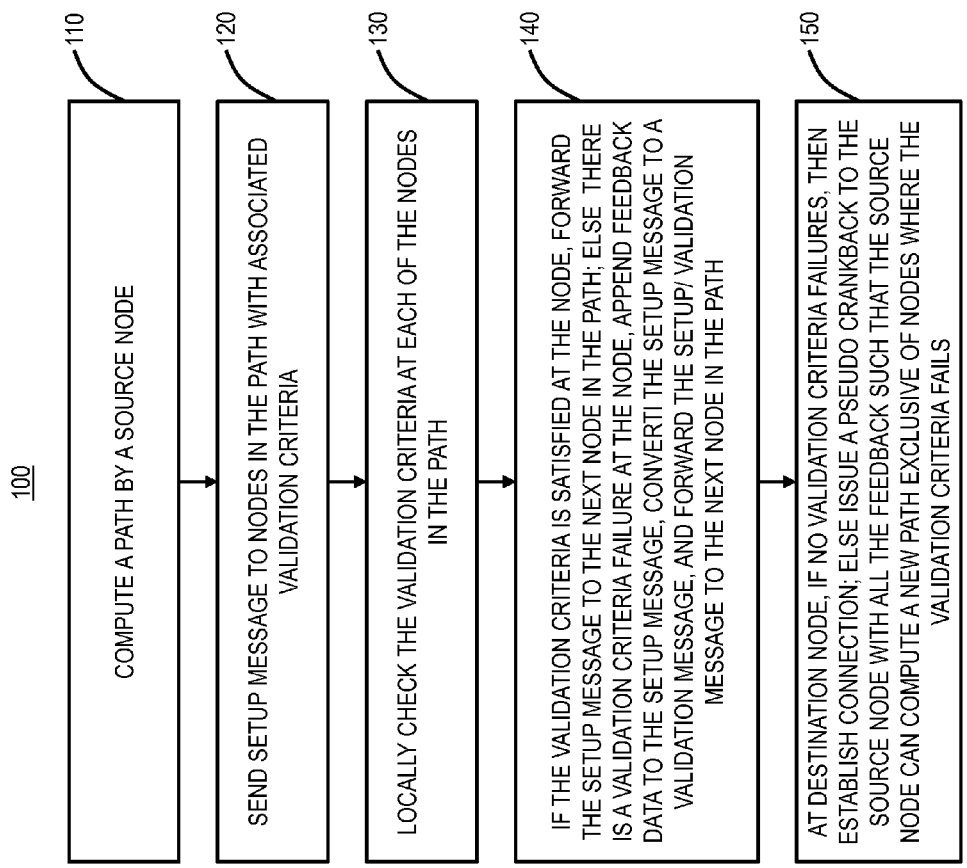
FIG. 4 is a flowchart illustrates a validation method which converts a setup message to a setup/validation message subsequent to a validation criteria failure in call/connection establishment.

Referring to FIG. 4, in an exemplary embodiment, a flowchart illustrates a validation method 100 which converts a setup message to a setup/validation message subsequent to a validation criteria failure in call/connection establishment. Specifically, the validation method 100 addresses the aforementioned limitations in the conventional behavior to avoid the second crankback by continuing to traverse a computed path despite a validation criteria failure (e.g., the node 12E does not issue a crankback). Rather, feedback is collected at all of the nodes where there is a validation criteria failure (i.e., the nodes 12E, 12F), and at the destination node 12D, a crankback message is sent with the feedback such that the source node 12A can compute the new path exclusive of all the nodes which fail the validation criteria. The validation method 100 contemplates operation in the network 10 or the like. Note, while described herein as a setup message and a setup/validation message, the validation method 100 contemplates any type of connection message that needs validation such as a connection establishment message, a connection modify message, a connection resize message, an activity message, or any other message.

The validation method 100 is implemented responsive to a requirement for a new signaled connection in a network, e.g., an SNC, LSP, etc., and subsequent to the requirement, the validation method 100 include computing a path by the source node (step 110). The validation method 100 contemplates any path computation technique as is known in the art such as, for example, open shortest path first (OSPF), constrained shortest path first (CSPF), Dijkstra's algorithm, etc. Here, the validation method 100 computes the path based on information in a routing database associated with the source node; however, the path can also have other criteria which is not determined since it is not known by the source node, i.e., the validation criteria. Subsequent to computing the path, the source node sends setup message to nodes in the path with associated validation criteria (step 120).

The validation method 100 includes locally checking the validation criteria at each of the nodes in the path (step 130). Here, each node checks the validation criteria based on its local information, and the setup can pass or fail at this node. Next, for each node in the path, if the validation criteria is satisfied at the node, that node forwards the setup message to the next node in the path; else there is a validation criteria failure at the node, and that node appends feedback data to the setup message, converts the setup message to a validation message, and forwards the setup/validation message to the next node in the path (step 140). Here, subsequent to a failed validation criteria, instead of an immediate crankback, the setup message is converted to a validation message to gather information about all of the nodes in the path so the subsequent path computation can utilize this information to avoid problematic nodes and avoid crankbacks.

Finally, the validation method 100 includes, at the destination node, if there were no validation criteria failures, then the connection is established; else, the destination node issues a pseudo crankback to the source node with all the feedback such that the source node can compute a new path exclusive of nodes where the validation criteria fails (step 150). If there are no problematic nodes, the validation method 100 simply completes the call and sets up the connection. However, if there are problematic nodes, i.e., nodes failing the validation criteria, the validation method 100 provides the source node such feedback so that the second path computation can exclude any of the problematic nodes thereby eliminating the problems illustrated in FIGS. 2-3.

Figure 5:
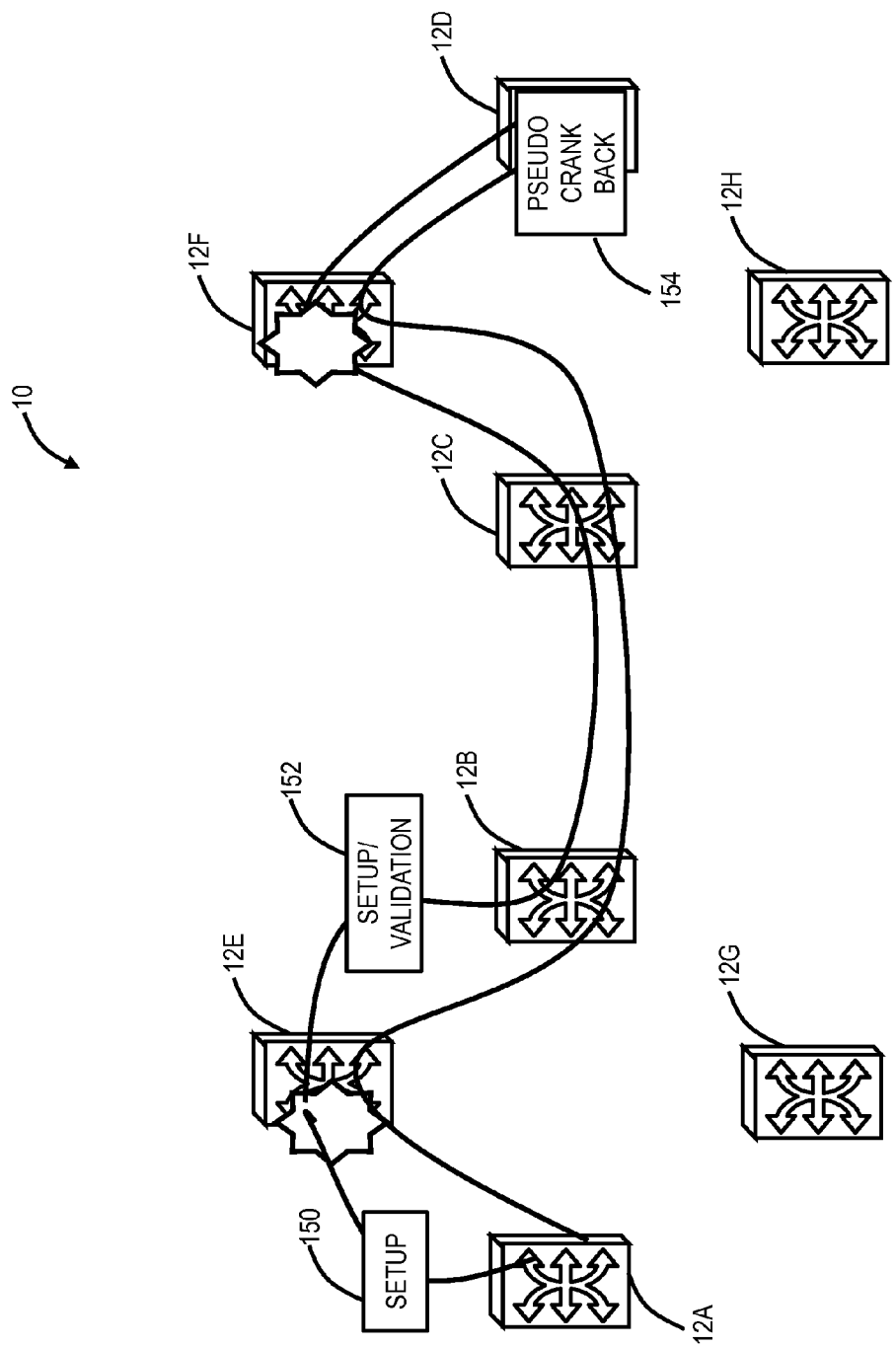
FIG. 5 is a network diagram of the network of FIG. 1 showing an exemplary implementation of the validation method of FIG. 4 for a first attempt to establish a connection when two or more nodes in a computed path fail the validation criteria.
Figure 6:
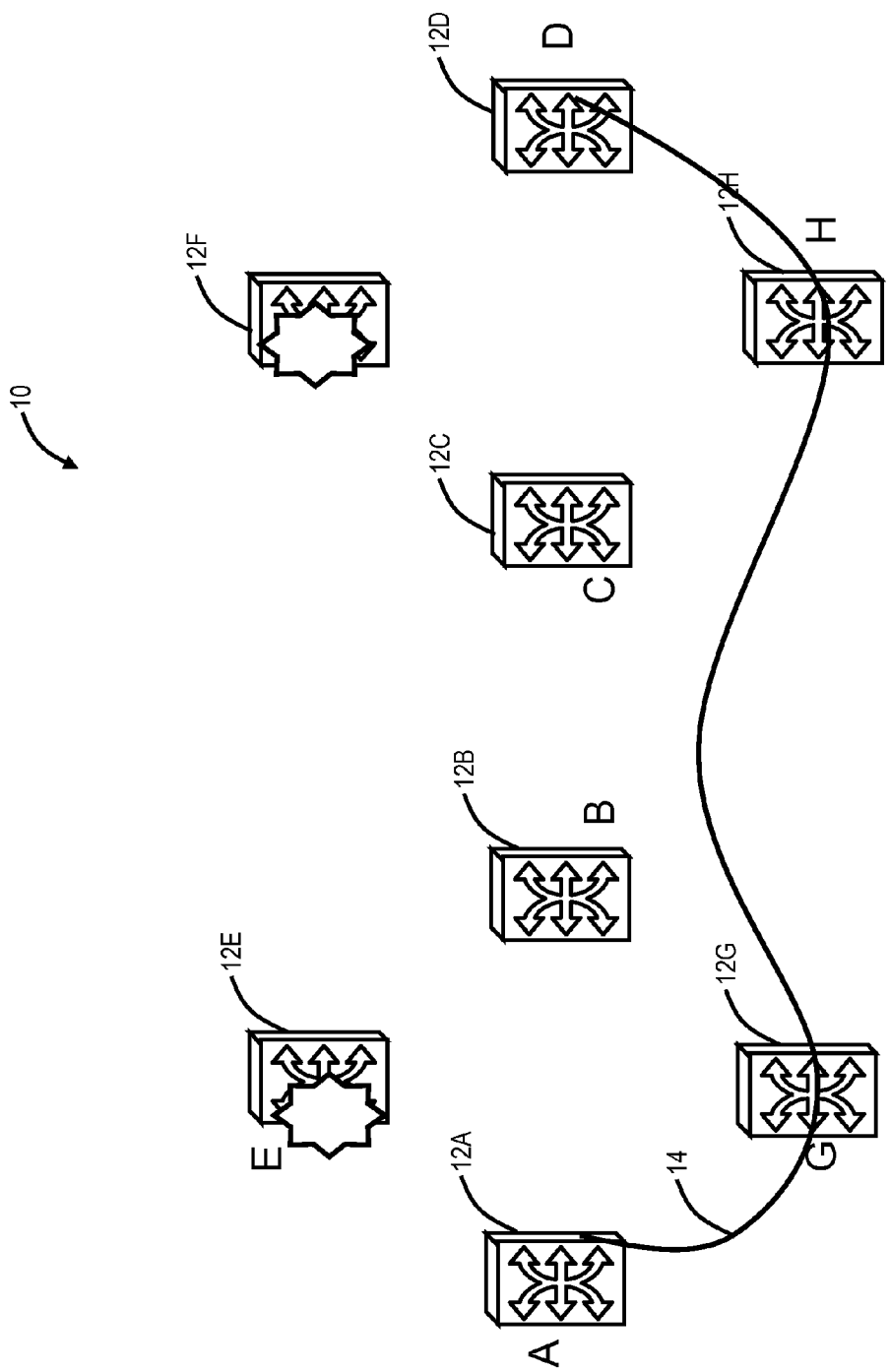
FIG. 6 is a network diagram of the network of FIG. 1 showing an exemplary implementation of the validation method of FIG. 4 for a second attempt from FIG. 5 to establish a connection when two or more nodes in a computed path fail the validation criteria.

Referring to FIGS. 5-6, in an exemplary embodiment, network diagrams illustrate the network 10 showing an exemplary implementation of the validation method 100 when two or more nodes 12E, 12F in a computed path fail the validation criteria. Specifically, FIGS. 5-6 include the same SNC 14 as FIGS. 2-3, again in this example, the nodes 12E, 12F fail the validation criteria set by the source node 12A. For example, the validation criteria can include that the SNC 14 has absolute route diversity (ARD) from another SNC (not shown) in the network 10 and since the source node 12A does not store the paths for all connections in the network 10, this validation criteria has to be evaluated locally at the various nodes 12. Other types of validation criteria are also contemplated. For example, this exemplary embodiment in FIGS. 5-6 is applicable at mesh time such that a new connection (e.g., an SNC) can find a new path with only one crankback.

In FIG. 5, the source node 12A computes the path for the SNC 14 as before, i.e., through the nodes 12E, 12B, 12C, 12F, 12D. Subsequent to path computation, the source node 12A sends a setup message 150 with the associated validation criteria (e.g., ARD from another SNC, etc.) to the node 12E which performs local validation of the validation criteria consistent with the setup message 150. Since the node 12E fails the validation criteria, the node 12E converts the setup message 150 to a setup/validation message 152 where feedback is added to the setup/validation message 152 regarding the reason for the node 12E failing the validation criteria (e.g., the node 12E is no route diverse, etc.) and the setup/validation message 152 is forwarded to the node 12B. Note, unlike the conventional behavior, the node 12E does not issue the first crankback message 22 to the node 12A.

The node 12B performs local validation of the validation criteria consistent with the setup message 150 and passes the validation criteria, and forwards the setup/validation message 152 to the node 12C. The node 12C performs local validation of the validation criteria consistent with the setup message 150 and also passes the validation criteria, and forwards the setup/validation message 152 to the node 12F. Note, the nodes 12B, 12C can append their feedback information in the setup/validation message 152, i.e., we pass the validation criteria, or not provide any feedback at all. The source node 12A, for recomputing a new path, needs to know which of the nodes 12 to exclude, so either feedback approach can be utilized.

The node 12F performs local validation of the validation criteria consistent with the setup message 150, but like the node 12E, the node 12F fails the validation criteria. The node 12E adds this feedback information to the setup/validation message 152 and forwards it to the node 12D, the destination node. The destination node 12D does not work to setup the SNC 14 based on the setup/validation message 152; instead, the destination node 12D, realizing one or more of the nodes 12 fail the validation criteria, issues a pseudo crankback message 154 to the node 12A, the source node, with all of the feedback from the setup/validation message 152 included therein. This concludes the first try in FIG. 5, and the source node 12A is notified of the validation criteria failure, but also has the feedback such that the next path computation can be made appropriately. Note, in an exemplary embodiment, the setup/validation message 152 is the same format as the setup message 150 with additional information included therein and the pseudo crankback message 154 is the same as the crankback messages 22, 26. Advantageously, this allows operation in the control plane without modification or addition of signaling. Rather, the additional information is added in existing fields of these messages (e.g., Type/Length/Value (TLV) fields, vendor-specific fields, reserved fields, undefined fields, etc.).

In FIG. 6, the source node 12A receives the pseudo crankback message 154 along with the feedback information, i.e., that the new path should exclude the nodes 12E, 12F. Here, the source node 12A recomputes a new path through the nodes 12G, 12H, 12D. Note, in FIG. 3, without implementing the validation method 400, the source node 12A recomputes the new path through the nodes 12G, 12C, 12F, 12D. Here, the source node 12A is instructed to exclude the nodes 12E, 12F from path computation resulting in the new path which, upon transmission of the setup message, local validation criteria checks at the nodes 12G, 12H, and receipt at the destination node 12D, the SNC 14 is established satisfying the validation criteria.

As described above, one advantage of the validation method 400 is it requires minimal changes in the control plane. Specifically, no new messages are required and the behavior is implemented by changes in the nodes 12. For example, at the originating node, the setup message 150 can be the standard control plane setup message with a new Information Element (IE) or the like in the setup message. This IE can have two aspects—a setup state (valid or fail) and a validation vector. The setup state—1 or 0—indicates if the setup state is okay, i.e., the setup message 150 is a normal setup message as no nodes have failed the validation criteria, or has failed, i.e., the setup message 150 is now the setup/validation message 152 as at least one of the nodes 12 has failed the local validation criteria check. The validation vector can have bit sets corresponding to types of validations that each of the nodes 12 needs to perform after receiving the setup message with setup state fail, i.e., the setup/validation message 152. Similarly, the pseudo crankback message 154 is similar to the crankback messages 22, 26 with the results or feedback from the setup/validation message 152 included therein so the originating node will receive feedback of the complete path in a release message, i.e., the setup/validation message 152, to take appropriate action based on failure feedbacks from multiple hops in the path.

At an immediate node for setup processing, if the setup message is received with the setup state as OK, the intermediate node will treat this as normal setup message and try to reserve resources as usual. In case this setup process fails due to any validations, the intermediate node will not send an immediate crankback. Instead, the intermediate node will update the setup state as FAIL, create dummy connection points so as to forward the setup message to the next node as the setup/validation message. Before sending it out, the intermediate node will update the feedback for all the validations indicated in the validation vector. If the intermediate node receives the setup/validation message with the setup state set to FAIL, the intermediate node will only perform the validations indicated by the validation vector, add/modify its feedback if required, and forward the setup/validation message to the next node. The intermediate node will create the dummy connection points to forward the setup/validation message to the next node and to handle release. These dummy connection points do not allocate bandwidth, but allow the processing of the setup/validation message in the same manner a normal setup message is processed with real connection points that do allocate bandwidth. Note, subsequent to the intermediate node receiving the pseudo crankback message or release message, the intermediate node receives feedback of the complete path and can perform clean up by releasing the dummy connection points and forwarding the pseudo crankback message on to the source node.

At the destination or terminating node, if the terminating node receives a setup message with the setup state as OK, the terminating node processes the message as usual to establish a connection. If the terminating node receives a setup/validation message, i.e., a setup message with the setup state as FAIL, the terminating node will perform the validations indicated by the validation vector, add/modify its feedback if required, and will generate pseudo crankback message or release message with all feedbacks towards the originating node. Note, the terms crankback and release can be used interchangeably.

Figure 7:
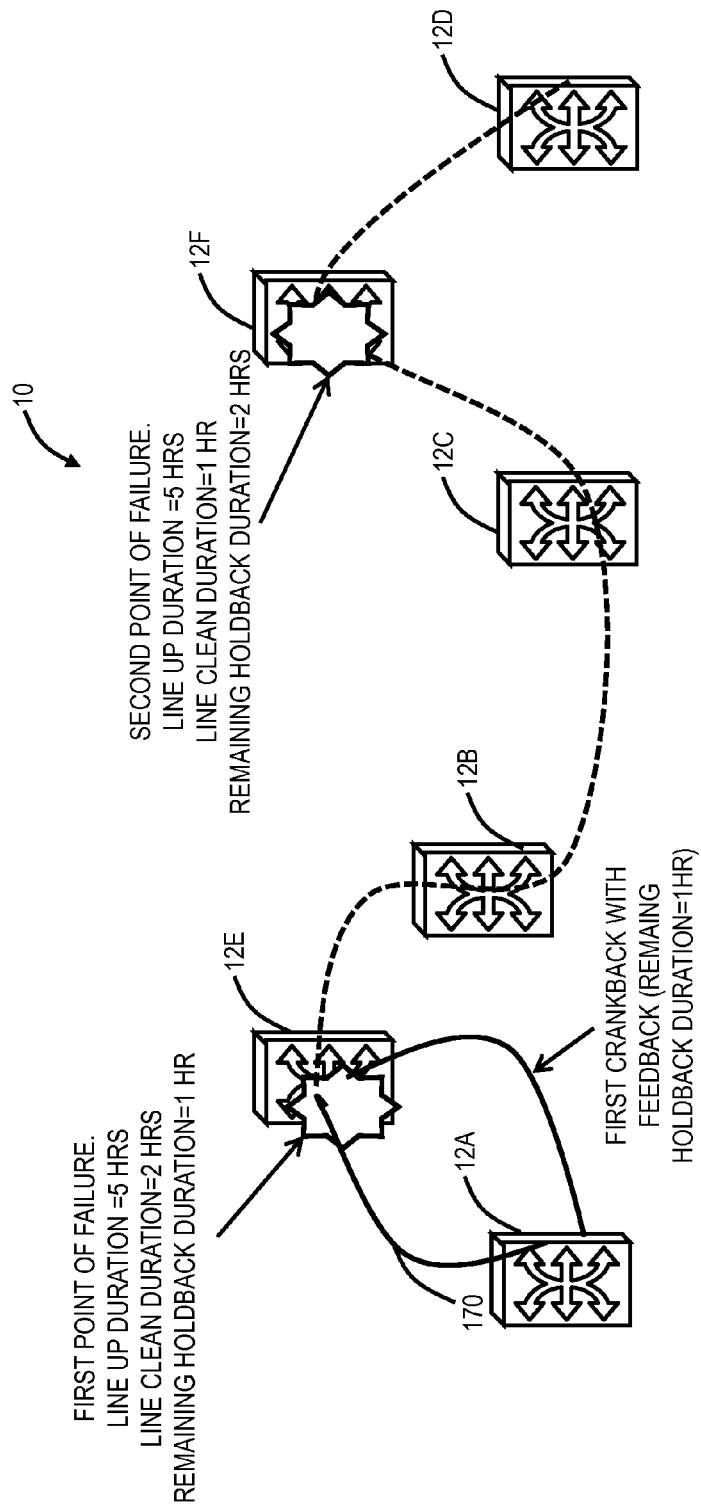
FIGS. 7-8 are network diagrams of the network FIG. 1 showing behavior in a Time of Day Reversion (TODR) application.
Figure 8:
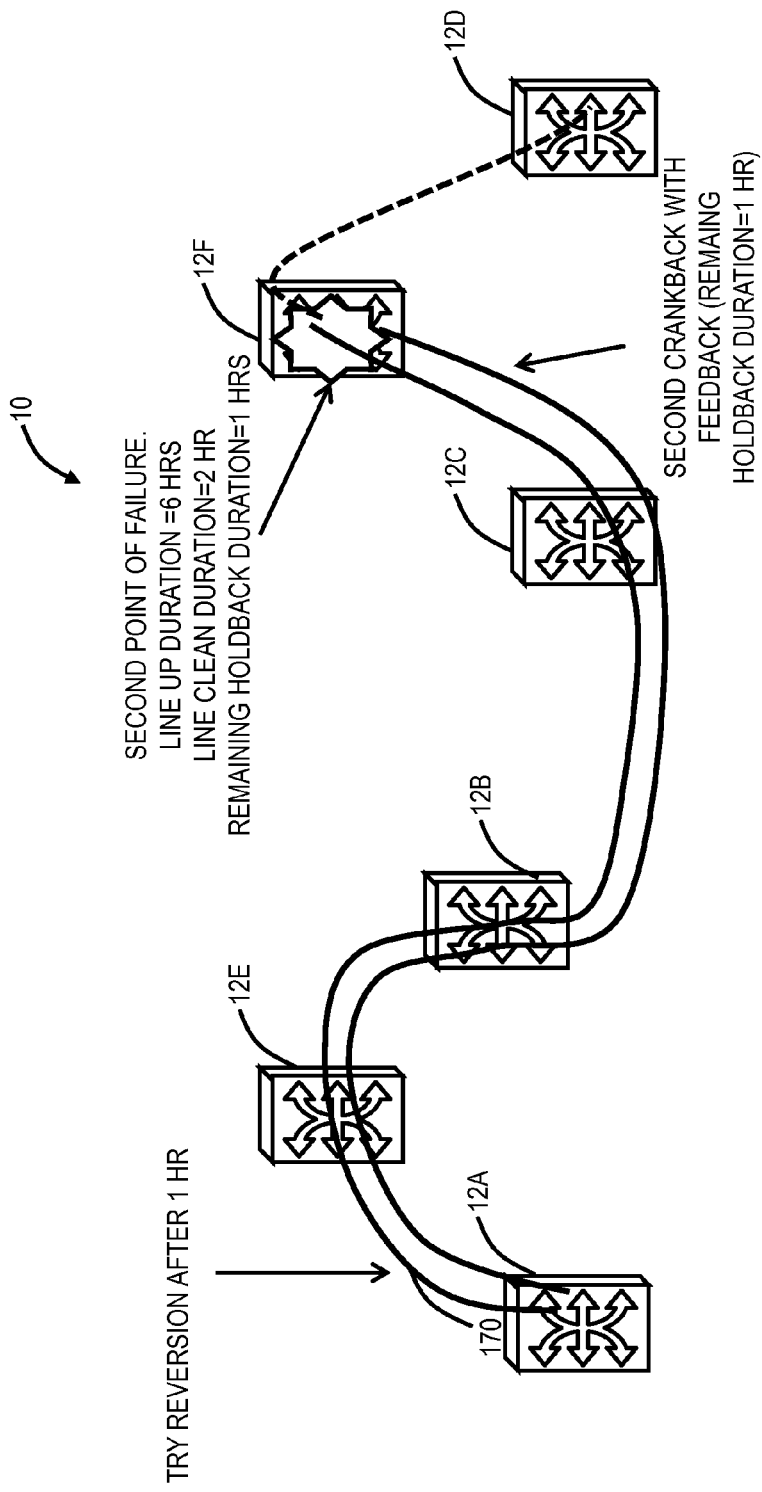
Figure 9:
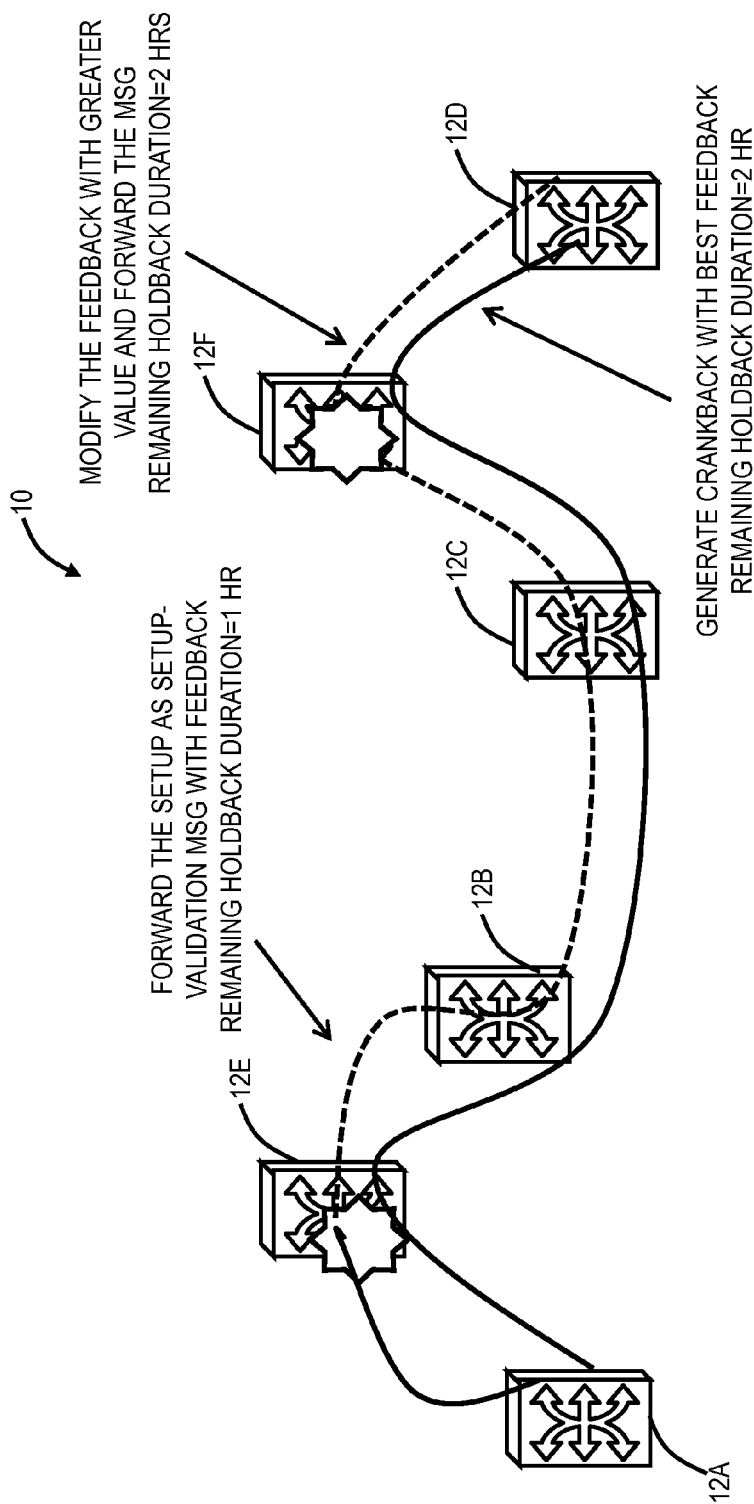
FIG. 9 is a network diagram of the network FIG. 1 showing an exemplary implementation of the validation method in a Time of Day Reversion (TODR) application.

Referring to FIGS. 7-9, in an exemplary embodiment, network diagrams illustrate the network 10 showing an exemplary implementation of the validation method 100 (FIG. 9) in a Time of Day Reversion (TODR) application and current behavior (FIGS. 7-8). In TODR, an SNC (or other connection) can automatically revert to its home path 170 per TODR configuration. For example, assume an SNC is currently on a protect path and is configured to a TODR time of Monday-1:00 AM with TODR window 5 hrs. and holdback duration of 3 hrs. Using the same examples described herein, the SNC has a validation criteria failure on the home path 170 at the nodes 12E, 12F. FIG. 7 illustrates the TODR application with the home path 170 and with the validation criteria failures at the nodes 12E, 12F when the SNC tries to revert to the home path 170 in the TODR application.

In FIG. 7, the SNC is moving from the protect path to the home path 170. As soon as the TODR window hits, the SNC tries to revert on the home path 170. In the foregoing description, various assumptions are made to illustrate the TODR application. For example, since the home path is up for the last 5 hrs. and the holdback duration is 3 hrs., the SNC can send reversion setup with a holdback duration 3 hrs., i.e., the reversion setup can be a setup message as described herein. When the setup message reaches the node 12E (master), it validates the holdback criteria on the line and finds the line dirty. Conventionally, the node 12E generates a release (crankback) with information regarding the remaining holdback duration (1 hr.). This means the line on the node 12E is expected to become clean after 1 hr. Since the TODR window is 5 hrs., the next reversion time lies within the TODR window and the next reversion attempt will happen after 1 hr. In FIG. 8, it is shown that even if reversion is tried after 1 hr., it is going to fail on the node 12F, because the remaining holdback duration was 2 hrs. at the node 12F when it was 1 hr. at the node 12E. So this time, the node 12F will generate crankback with the remaining holdback period (1 hr.). The next reversion attempt after 1 hr. will succeed. Note, the number of failure nodes could be one or much more than 2 (e.g., 20). So crankbacks can increase accordingly.

In FIG. 9, the validation method 100 can be used to avoid multiple crankbacks in the TODR application. Here, the setup message is converted to the setup/validation message as described herein. When the setup message reaches the node 12E, it validates the holdback criteria on the line and finds the line dirty. The node 12E marks this setup message as a failed setup message and forwards it towards the terminating node as the setup/validation message. On the nodes 12B, 12C, this setup message will be handled as a validation message. The setup/validation message is forwarded to the node 12F which also validates the holdback criteria and validation fails with an even larger value (remaining holdback duration=2 hrs.) with respect to the holdback duration which came from the previous node as part of the setup/validation message. The node 12F modifies the current feedback value in the setup/validation message with its own feedback and forwards it to the terminating node 12D.

The terminating node 12D generates the release (pseudo crankback) towards the originating node 12A with the feedback information received in the setup/validation message. The originating node 12A receives the feedback, i.e., that the path is supposed to get clean after 2 hrs. So after 2 hrs. only reversion will be tried if the TODR window is still alive. This enables a reduction in crankbacks as the originating node 12A has full information on the home path 170, and not just information up to the first criteria failure (i.e., the node 12E). Accordingly, the originating node 12A now knows to hold off for 2 hrs., based on the node 12F, and not the 1 hr. based on the node 12E.

Another exemplary application of the validation method 100 can include ODUflex resizing. ODUflex connections can have various sizes and can be hitlessly resized (such as via G.7044). The validation method 100 can be used here where a resize message is treated like the setup message and upon a criteria failure (e.g., inability to resize at one of the nodes such as due to an aggregated link without sufficient bandwidth, etc.), the resize message can be treated as a resize/validation message similarly to the setup/validation message. Here, the feedback to the source node can be the minimum size available to resize the ODUflex connection to (as opposed to which nodes to exclude or hold off timing, etc.). That is, the feedback in the validation method 100 can be different depending on the validation criteria.

Referring to FIG. 10, in an exemplary embodiment, a block diagram illustrates an exemplary node 12 for use with the systems and methods described herein. In an exemplary embodiment, the exemplary node 12 can be a network element that may consolidate the functionality of a multi-service provisioning platform (MSPP), digital cross connect (DCS), Ethernet and/or Optical Transport Network (OTN) switch, dense wave division multiplexed (DWDM) platform, etc. into a single, high-capacity intelligent switching system providing Layer 0, 1, and/or 2 consolidation. In another exemplary embodiment, the node 12 can be any of an OTN add/drop multiplexer (ADM), a multi-service provisioning platform (MSPP), a digital cross-connect (DCS), an optical cross-connect, an optical switch, a router, a switch, a wavelength division multiplexing (WDM) terminal, an access/aggregation device, etc. That is, the node 12 can be any digital system with ingress and egress digital signals and switching therebetween of channels, timeslots, tributary units, etc. While the node 12 is generally shown as an optical network element, the systems and methods contemplated for use with any switching fabric, network element, or network based thereon.

In an exemplary embodiment, the node 12 includes common equipment 210, one or more line modules 220, and one or more switch modules 230. The common equipment 210 can include power; a control module; operations, administration, maintenance, and provisioning (OAM&P) access; user interface ports; and the like. The common equipment 210 can connect to a management system 250 through a data communication network 260 (as well as a Path Computation Element (PCE), Software Defined Network (SDN) controller, OpenFlow controller, etc.). The management system 250 can include a network management system (NMS), element management system (EMS), or the like. Additionally, the common equipment 210 can include a control plane processor, such as a controller 300 illustrated in FIG. 3, configured to operate the control plane 130 as described herein. The node 12 can include an interface 270 for communicatively coupling the common equipment 210, the line modules 220, and the switch modules 230 therebetween. For example, the interface 270 can be a backplane, mid-plane, a bus, optical or electrical connectors, or the like. The line modules 220 are configured to provide ingress and egress to the switch modules 230 and to external connections on the links 120 to/from the node 12. In an exemplary embodiment, the line modules 220 can form ingress and egress switches with the switch modules 230 as center stage switches for a three-stage switch, e.g. a three stage Clos switch. Other configurations and/or architectures are also contemplated. The line modules 220 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, etc.

Further, the line modules 220 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, and 100 Gb/s, N×1.25 Gb/s, and any rate in between. The line modules 220 can include wavelength division multiplexing interfaces, short reach interfaces, and the like, and can connect to other line modules 220 on remote network elements, end clients, edge routers, and the like, e.g. forming connections on the links 120. From a logical perspective, the line modules 220 provide ingress and egress ports to the node 12, and each line module 220 can include one or more physical ports. The switch modules 230 are configured to switch channels, timeslots, tributary units, packets, etc. between the line modules 220. For example, the switch modules 230 can provide wavelength granularity (Layer 0 switching), SONET/SDH granularity such as Synchronous Transport Signal-1 (STS-1) and variants/concatenations thereof (STS-n/STS-nc), Synchronous Transport Module level 1 (STM-1) and variants/concatenations thereof, Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical Channel Data Unit-flex (ODUflex), Optical channel Payload Virtual Containers (OPVCs), ODTUGs, etc.; Ethernet granularity; Digital Signal n (DSn) granularity such as DS0, DS1, DS3, etc.; and the like. Specifically, the switch modules 230 can include Time Division Multiplexed (TDM) (i.e., circuit switching) and/or packet switching engines. The switch modules 230 can include redundancy as well, such as 1:1, 1:N, etc. In an exemplary embodiment, the switch modules 230 provide OTN switching and/or Ethernet switching.

Those of ordinary skill in the art will recognize the node 12 can include other components which are omitted for illustration purposes, and that the systems and methods described herein are contemplated for use with a plurality of different network elements with the node 12 presented as an exemplary type of network element. For example, in another exemplary embodiment, the node 12 may not include the switch modules 230, but rather have the corresponding functionality in the line modules 220 (or some equivalent) in a distributed fashion. For the node 12, other architectures providing ingress, egress, and switching therebetween are also contemplated for the systems and methods described herein. In general, the systems and methods described herein contemplate use with any network element providing switching of channels, timeslots, tributary units, wavelengths, etc. and using the control plane 130. Furthermore, the node 12 is merely presented as one exemplary node 12 for the systems and methods described herein.

In an exemplary embodiment, the node 12 can include one or more ports (e.g., via the line modules 220) forming a part of a connection in a network; and a controller communicatively coupled to the one or more ports and operating a control plane with other nodes in the network, the controller is configured to: if the node is a source node for the connection, compute a path for the connection and send a message to nodes in the path with associated validation criteria for each of the nodes in the path; if the nodes is an intermediate node in the path, if the validation criteria is satisfied at the node, forward the message to the next node in the path; else there is a validation criteria failure at the node, append feedback data to the message, convert the message to a validation message, and forward the validation message to the next node in the path; and if the node is a destination node for the connection, if there are no validation criteria failures, then establish the connection; else issue a release message to the source node with all the feedback such that the source node can compute a new path exclusive of nodes where the validation criteria fails. The message can be a connection message that needs validation such as a connection establishment message, a connection modify message, a connection resize message, an activity message, or any other message.

Figure 11:
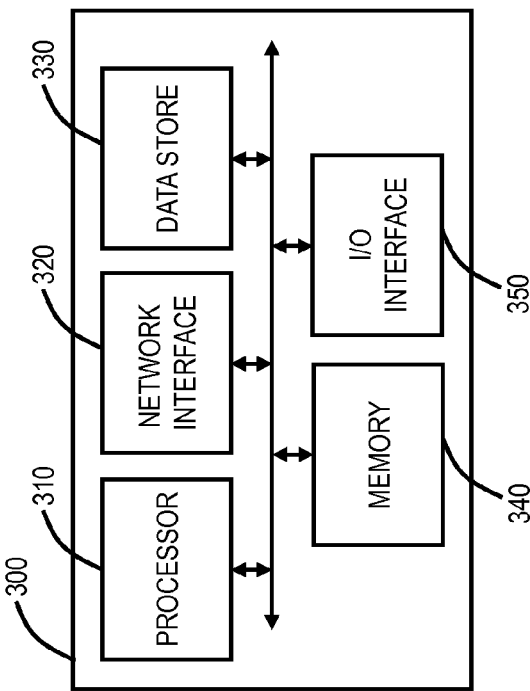

Referring to FIG. 11, in an exemplary embodiment, a block diagram illustrates a controller 300 to provide control plane processing and/or operations, administration, maintenance, and provisioning (OAM&P) for the node 12. The controller 300 can be part of common equipment, such as common equipment 210 in the node 12, or a stand-alone device communicatively coupled to the node 12 via the DCN 260. The controller 300 can include a processor 310 which is hardware device for executing software instructions such as operating the control plane. The processor 310 can be any custom made or commercially available processor, a central processing unit (CPU), an auxiliary processor among several processors associated with the controller 300, a semiconductor-based microprocessor (in the form of a microchip or chip set), or generally any device for executing software instructions. When the controller 300 is in operation, the processor 310 is configured to execute software stored within memory, to communicate data to and from the memory, and to generally control operations of the controller 300 pursuant to the software instructions. The controller 300 can also include a network interface 320, a data store 330, memory 340, an I/O interface 350, and the like, all of which are communicatively coupled therebetween and with the processor 310.

The network interface 320 can be used to enable the controller 300 to communicate on the DCN 260, such as to communicate control plane information to other controllers, to the management system 250, and the like. The network interface 320 can include, for example, an Ethernet card (e.g., 10 BaseT, Fast Ethernet, Gigabit Ethernet) or a wireless local area network (WLAN) card (e.g., 802.11). The network interface 320 can include address, control, and/or data connections to enable appropriate communications on the network. The data store 330 can be used to store data, such as control plane information, provisioning data, OAM&P data, etc. The data store 330 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 330 can incorporate electronic, magnetic, optical, and/or other types of storage media. The memory 340 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 340 may incorporate electronic, magnetic, optical, and/or other types of storage media. Note that the memory 340 can have a distributed architecture, where various components are situated remotely from one another, but may be accessed by the processor 310. The I/O interface 350 includes components for the controller 300 to communicate to other devices. Further, the I/O interface 350 includes components for the controller 300 to communicate with the other nodes, such as using overhead associated with OTN signals.

In an exemplary embodiment, the controller 300 is configured to communicate with other controllers 300 in the network 100 to operate the control plane 130 for control plane signaling. This communication may be either in-band or out-of-band. For SONET networks and similarly for SDH networks, the controllers 300 may use standard or extended SONET line (or section) overhead for in-band signaling, such as the Data Communications Channels (DCC). Out-of-band signaling may use an overlaid Internet Protocol (IP) network such as, for example, User Datagram Protocol (UDP) over IP. In an exemplary embodiment, the controllers 300 can include an in-band signaling mechanism utilizing OTN overhead. The General Communication Channels (GCC) defined by ITU-T Recommendation G.709 are in-band side channels used to carry transmission management and signaling information within Optical Transport Network elements. The GCC channels include GCC0 and GCC1/2. GCC0 are two bytes within Optical Channel Transport Unit-k (OTUk) overhead that are terminated at every 3R (Re-shaping, Re-timing, Re-amplification) point. GCC1/2 are four bytes (i.e. each of GCC1 and GCC2 include two bytes) within Optical Channel Data Unit-k (ODUk) overhead. In the present invention, GCC0, GCC1, GCC2 or GCC1+2 may be used for in-band signaling or routing to carry control plane traffic. Based on the intermediate equipment's termination layer, different bytes may be used to carry control plane signaling. If the ODU layer has faults, it has been ensured not to disrupt the GCC1 and GCC2 overhead bytes and thus achieving the proper delivery control plane signaling. Other mechanisms are also contemplated for control plane signaling.

The controller 300 is configured to operate the control plane 130 in the network 100. That is, the controller 300 is configured to implement software, processes, algorithms, etc. that control configurable features of the network 100, such as automating discovery of the nodes 12, capacity on the links, port availability on the nodes 12, connectivity between ports; dissemination of topology and bandwidth information between the nodes 12; path computation and creation for connections; network level protection and restoration; and the like. As part of these functions, the controller 300 can include a topology database that maintains the current topology of the network 100 based on control plane signaling (e.g., HELLO messages) and a connection database that maintains available bandwidth on the links 120 again based on the control plane signaling. Again, the control plane 130 is a distributed control plane; thus a plurality of the controllers 300 can act together to operate the control plane 130 using the control plane signaling to maintain database synchronization. In source-based routing, the controller 300 at a source node for a connection is responsible for path computation and establishing by signaling other controllers 300 in the network 100. For example, the source node and its controller 300 can signal a path through various techniques such as Resource Reservation Protocol-Traffic Engineering (RSVP-TE) (G.7713.2), Private Network-to-Network Interface (PNNI), Constraint-based Routing Label Distribution Protocol (CR-LDP), etc. and the path can be signaled as a Designated Transit List (DTL) in PNNI or an Explicit Route Object (ERO) in RSVP-TE/CR-LDP. As described herein, the connection refers to a signaled, end-to-end connection such as an SNC, SNCP, LSP, etc. Path computation generally includes determining a path, i.e. traversing the links 120 through the nodes 12 from the source node to the destination node based on a plurality of constraints such as administrative weights on the links 120, bandwidth availability on the links 120, etc. The source node can also defined the validation constraints that are provided in the setup messages.

Note, the controller 300 can be located at a source node, an intermediate node, or a destination node for a specific connection. In a source node, the controller 300 can be configured to compute a path for the connection and to send a message to nodes in the path with associated validation criteria for each of the nodes in the path. In intermediate nodes, the controller 300 can be configured to, if the validation criteria is satisfied at the node, forward the setup message to the next node in the path; else there is a validation criteria failure at the node, append feedback data to the setup message, convert the message to a validation message, and forward the validation message to the next node in the path. In the destination node, the controller 300 can be configured to, if there are no validation criteria failures, then establish the connection; else issue a release message to the source node with all the feedback such that the source node can compute a new path exclusive of nodes where the validation criteria fails. The message can be a connection message that needs validation such as a connection establishment message, a connection modify message, a connection resize message, an activity message, or any other message.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, comprising:
computing a path by a source node;
sending a message to nodes in the path with associated validation criteria;
locally checking the validation criteria at each of the nodes in the path;
if the validation criteria is satisfied at the node, forwarding the message to the next node in the path; else there is a validation criteria failure at the node, appending feedback data to the message, converting the message to a validation message, and forwarding the validation message to the next node in the path; and
at a destination node, if there are no validation criteria failures, then establishing the connection; else issuing a release message to the source node with all the feedback such that the source node can compute a new path exclusive of nodes where the validation criteria fails.

2. The method of claim 1, further comprising:
computing the path by the source node based on information flooded to the source node in a control plane; and
determining the associated validation criteria based on lacking the information at the source node such that the associated validation criteria has to be locally checked at each of the nodes in the path.

3. The method of claim 1, further comprising:
providing the feedback at each of the nodes in the path where there is a validation criteria failure based on the associated validation criteria.

4. The method of claim 3, wherein the feedback comprises which nodes to avoid in the new path, a minimum size for resizing the connection, and/or a hold off time.

5. The method of claim 1, wherein the network comprises an optical network and the control plane comprises any of Automatically Switched Optical Network (ASON), Generalized Multi-Protocol Label Switching (GMPLS), and Optical Signaling and Routing Protocol (OSRP).

6. The method of claim 5, wherein the validation message comprises a standard setup message in the control plane with additional information related to setup state (setup is OK or FAILED), validation criteria, and feedback.

7. The method of claim 5, wherein the release message comprises a standard crankback message in the control plane with additional information related to the feedback.

8. A network, comprising:
a source node for a connection configured to compute a path for the connection and to send a message to nodes in the path with associated validation criteria for each of the nodes in the path;
each of the nodes in the path configured to, if the validation criteria is satisfied at the node, forward the message to the next node in the path; else there is a validation criteria failure at the node, append feedback data to the message, convert the message to a validation message, and forward the validation message to the next node in the path; and
a destination node for the connection configured to, if there are no validation criteria failures, then establish the connection; else issue a release message to the source node with all the feedback such that the source node can compute a new path exclusive of nodes where the validation criteria fails.

9. The network of claim 8, wherein the source node is configured to:
compute the path based on information flooded to the source node in a control plane; and
determine the associated validation criteria based on lacking the information at the source node such that the associated validation criteria has to be locally checked at each of the nodes in the path.

10. The network of claim 8, wherein the each of the nodes in the path and the destination node are configured to:
provide the feedback where there is a validation criteria failure based on the associated validation criteria.

11. The network of claim 10, wherein the feedback comprises which nodes to avoid in the new path, a minimum size for resizing the connection, and/or a hold off time.

12. The network of claim 8, wherein the network comprises an optical network and the control plane comprises any of Automatically Switched Optical Network (ASON), Generalized Multi-Protocol Label Switching (GMPLS), and Optical Signaling and Routing Protocol (OSRP).

13. The network of claim 12, wherein the validation message comprises a standard setup message in the control plane with additional information related to setup state (setup is OK or FAILED), validation criteria, and feedback.

14. The network of claim 12, wherein the release message comprises a standard crankback message in the control plane with additional information related to the feedback.

15. A node, comprising:
one or more ports forming a part of a connection in a network; and
a controller communicatively coupled to the one or more ports and operating a control plane with other nodes in the network, the controller is configured to:
if the node is a source node for the connection, compute a path for the connection and send a message to nodes in the path with associated validation criteria for each of the nodes in the path;
if the node is an intermediate node in the path, if the validation criteria is satisfied at the node, forward the message to the next node in the path; else there is a validation criteria failure at the node, append feedback data to the message, convert the message to a validation message, and forward the validation message to the next node in the path; and
if the node is a destination node for the connection, if there are no validation criteria failures, then establish the connection; else issue a release message to the source node with all the feedback such that the source node can compute a new path exclusive of nodes where the validation criteria fails.

16. The node of claim 15, wherein if the node is the source node, the node is configured to:
  compute the path based on information flooded to the source node in a control plane; and
  determine the associated validation criteria based on lacking the information at the source node such that the associated validation criteria has to be locally checked at each of the nodes in the path; and
  wherein if the node is the intermediate node or the destination node, the node is configured to:
  provide the feedback where there is a validation criteria failure based on the associated validation criteria.

17. The node of claim 16, wherein the feedback comprises which nodes to avoid in the new path, a minimum size for resizing the connection, and/or a hold off time.

18. The node of claim 15, wherein the network comprises an optical network and the control plane comprises any of Automatically Switched Optical Network (ASON), Generalized Multi-Protocol Label Switching (GMPLS), and Optical Signaling and Routing Protocol (OSRP).

19. The node of claim 18, wherein the validation message comprises a standard setup message in the control plane with additional information related to setup state (setup is OK or FAILED), validation criteria, and feedback.

20. The node of claim 18, wherein the release message comprises a standard crankback message in the control plane with additional information related to the feedback.

* * * * *